(12) United States Patent
Nguyen

(10) Patent No.: US 7,870,242 B2
(45) Date of Patent: Jan. 11, 2011

(54) FLEXIBLE COMPLIANCE AGENT WITH INTEGRATED REMEDIATION

(76) Inventor: Man Nguyen, c/o Microsoft Corporation, One Microsoft Way, Redmond, WA (US) 98052

( * ) Notice: Subject to any disclaimer, the term of this patent is extended or adjusted under 35 U.S.C. 154(b) by 50 days.

(21) Appl. No.: 12/243,413

(22) Filed: Oct. 1, 2008

(65) Prior Publication Data
US 2010/0082803 A1    Apr. 1, 2010

(51) Int. Cl.
G06F 15/173 (2006.01)
(52) U.S. Cl. .............................. 709/223; 709/224; 726/1
(58) Field of Classification Search .................. 709/224, 709/223, 203, 202; 726/1, 3, 6, 14, 22–26; 717/100, 120, 124, 128, 127; 706/47
See application file for complete search history.

(56) References Cited

U.S. PATENT DOCUMENTS

| | | | |
|---|---|---|---|
| 6,665,017 B1 | 12/2003 | Raiyat | |
| 7,253,843 B2 | 8/2007 | Lee | |
| 2004/0003399 A1 | 1/2004 | Cooper | |
| 2004/0181813 A1 | 9/2004 | Ota et al. | |
| 2004/0194134 A1 | 9/2004 | Gunatilake et al. | |
| 2005/0044570 A1 | 2/2005 | Poslinski | |
| 2005/0187963 A1* | 8/2005 | Markin | 707/102 |
| 2006/0109380 A1 | 5/2006 | Salomons | |
| 2006/0200803 A1* | 9/2006 | Neumann et al. | 717/120 |
| 2006/0236360 A1 | 10/2006 | Yuen et al. | |
| 2007/0091208 A1 | 4/2007 | Kim | |
| 2007/0143827 A1* | 6/2007 | Nicodemus et al. | 726/2 |
| 2008/0072259 A1 | 3/2008 | Seo et al. | |
| 2008/0301765 A1* | 12/2008 | Nicol et al. | 726/1 |
| 2009/0049518 A1* | 2/2009 | Roman et al. | 726/1 |
| 2009/0205011 A1* | 8/2009 | Jain et al. | 726/1 |
| 2009/0205012 A1* | 8/2009 | Jain et al. | 726/1 |

FOREIGN PATENT DOCUMENTS

WO    2008069782 A1    6/2008

OTHER PUBLICATIONS

"P.I.P.-ATNB Reference Manual", Crown Audio Division Technical Support Group, Elkhart, Indiana, US, Internet: <<http://www.crownintl.com>>, Retrieved at <<www.crownaudio.com/pdf/legacy/pipatnb.pdf>>, Sep. 1996, pp. 1-8.
Murph, Darren <<Poll: Do you utilize picture-in-picture functionality?>> Retrieved at <<http://www.engadgethd.com/2008/06/21/poll-do-you-utilize-picture-in-picture-functionality/>>, Date Jun. 21, 2008, pp. 6.

* cited by examiner

*Primary Examiner*—Frantz B Jean
(74) *Attorney, Agent, or Firm*—Boswell IP Law; J. Mason Boswell (57) ABSTRACT

A flexible compliance system is described herein that provides a deployable meta-agent and automated remediation of computer system compliance failures based on configurable compliance rules. An administrator defines one or more rules that represent compliance elements that the flexible compliance system will enforce. The flexible compliance system reads the rules defined by the administrator like a flexible set of conditions to check, and correlates the outcome of the conditions to the rules. The flexible compliance system may take various actions with respect to a computer system in violation of a rule, including attempting to resolve the violation or quarantining the computer system to avoid interaction with other computer systems. Administrators can use the flexible compliance system to define these and many other types of actions to automatically remediate non-compliant computer systems and protect the health of the organization's resources.

19 Claims, 6 Drawing Sheets

FLEXIBLE COMPLIANCE AGENT WITH INTEGRATED REMEDIATION

BACKGROUND

Organizations today are subject to a variety of regulations related to computer systems within the organization. Often, organizations undergo regular auditing to verify compliance with these regulations. General guidelines have been established for systems within an organization. For example, the Control Objectives for Information and related Technology (COBIT) is a set of recommended practices (i.e., a framework) for information technology (IT) management created by the Information Systems Audit and Control Association (ISACA) and the IT Governance Institute (ITGI) in 1992. COBIT provides managers, auditors, and IT users with a set of generally accepted measures, indicators, processes, and recommended practices to assist them in improving the benefits derived from information technology and developing appropriate IT governance and control in an organization. For example, some practices specify the applications that are allowed to run or that each computer system has up to date antivirus software. Other regulations govern specific industries. For example, the Health Insurance Portability and Accountability Act (HIPAA) enacted by the U.S. Congress in 1996 contains provisions that require health care providers to protect the privacy of patient information. These provisions extend to data stored on a health care provider's computer systems, and organizations often seek to verify the organization's compliance with such regulations.

Non-compliant systems are those computing systems within an organization that do not comply with one or more regulations placed in effect by the organization. There are two priorities that an organization typically has with respect to non-compliant computer systems. First, the organization wants to isolate non-compliant systems from compliant systems, to avoid spreading a problem or avoid unauthorized access to sensitive organizational data. For example, if a non-compliant computer system has a computer virus, the organization wants to avoid that virus spreading to other computer systems within the organization. Second, the organization wants to bring the non-compliant computer system back into compliance. This ensures that the user of the non-compliant computer system receives the level of service from the organization's IT resources that the user expects. For example, the user may expect to be able to access a corporate email server to check email, but for the security of other systems may be prevented from doing so if there is a problem with compliance.

Most compliance applications today focus on remotely auditing and detecting violations of the types of regulations or recommended practices noted above. These applications may routinely scan an organization's network from a central server to evaluate each computer system's compliance with a recommended practice. The applications often generate a report that IT personnel review and act upon. For example, the IT personnel may communicate with a user of a non-compliant computer system or block the non-compliant computer system from accessing certain resources (e.g., a corporate network). Existing systems provide a lot of information, but generate a correspondingly high burden on IT personnel that later consume the information and act upon it. For this reason, enterprises typically lack visibility into the effectiveness of their IT controls, which are designed to meet their business objectives and regulatory needs. Data that exists is often misaligned or disconnected from policies, regulations, and business and IT objectives.

In addition, the remote scanning process is limited by the bandwidth and computational resources of the central server, and does not scale well to large organizations (e.g., with thousands of computer systems). Even organizations that install agents on each computer system that maintain compliance (e.g., antivirus applications) are not completely safe. The agents reduce the burden on the central server, but can be installed and disabled by a user with high privilege. Agents that run on computer systems compete for memory and CPU when idle, which has a negative effect on the computer system's performance. Lastly, the longer the agent has been running on a computer system, the higher the chance of the agent being compromised and its data being manipulated.

SUMMARY

A flexible compliance system is described herein that provides a deployable meta-agent and automated remediation of computer system compliance failures based on configurable compliance rules. An administrator defines one or more rules that represent compliance elements that the flexible compliance system will enforce. When a specified event occurs, the system checks the compliance state (i.e., health) of a particular computer system. The flexible compliance system reads the rules defined by the administrator like a flexible set of conditions to check, and correlates the outcome of the conditions to the rules. The flexible compliance system may take various actions with respect to a computer system in violation of a rule, including attempting to resolve the violation or quarantining the computer system to avoid interaction with other computer systems. Administrators can use the flexible compliance system to define these and many other types of actions to automatically remediate non-compliant computer systems and protect the health of the organization's resources.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A flexible compliance system is described herein that provides a deployable meta-agent and automated remediation of computer system compliance failures based on configurable compliance rules. Unlike previous systems, the flexible compliance system integrates remediation of a compliance problem in an automated process that often does not involve the manual intervention of IT personnel. In addition, the system is flexible enough to allow an organization to define its own set of conditions for which the system checks and to define associated remediation steps that the system performs when the conditions are met. Thus, IT personnel are free to spend time on other tasks, such as improving the organization's policies or services.

In some embodiments, an administrator begins by defining one or more rules that represent compliance elements that the flexible compliance system will enforce. A rule can include a descriptive title (e.g., the COBIT section from which the rule is derived), one or more conditions that determine whether a computer system satisfies or violates the rule, and one or more remediation actions to take if a computer system violates the rule. For example, a rule condition may specify a particular value of a registry key (e.g., service pack version, virus signature, and so forth) that the system will look for to determine if the rule is satisfied. A rule condition may determine, for example, whether an antivirus service is set to run automatically at startup for a particular computer system by looking at the service startup value (e.g., for Windows "HKEY_LOCAL_MACHINE\SYSTEM\CurrentControl Set\Services\<service name>\Start"). At some point, a machine check event occurs that causes the system to check the compliance state (i.e., health) of a particular computer system. For example, a machine check event may be a logon of the computer system to a corporate network, the expiration of a timeout, the installation of a new application on the computer system, and so on.

When the machine check event occurs, the flexible compliance system surveys the compliance of the computer system. For example, the flexible compliance system may crawl the hard drive, registry, or other data store of the computer system to evaluate whether each rule defined by the administrator is satisfied. The flexible compliance system may operate remotely or as a downloadable agent that the flexible compliance system deploys to the computer system and that runs locally on the computer system. The flexible compliance system reads the rules defined by an administrator like a flexible set of conditions to check (e.g., a script), and correlates the outcome of the conditions to the rules defined by the administrator. The flexible compliance system may then provide a statement of health (SOH) to a central system (e.g., a compliance server, domain controller, and so forth) that indicates whether the computer system satisfies or violates each rule.

In response to the statement of health or based on predefined actions, the flexible compliance system may take various actions with respect to a computer system in violation of a rule. For example, the agent described herein running on the computer system may carry out automated remediation steps associated with the violated rule. For example, a rule that checks whether antivirus software is installed may specify automated remediation steps that download and install an antivirus software package used by the organization. The system may also attempt to resolve the violation by modifying a registry key, deleting a file (e.g., containing a virus), or uninstalling an application to restore the compliance of the computer system. In some cases, the system may quarantine the computer system from the network if the violation cannot be resolved to protect other computer systems.

Administrators can use the flexible compliance system to define these and many other types of actions to remediate non-compliant computer systems and protect the health of the organization's resources. Thus, the flexible compliance system provides automated intelligent remediation (AIR), which helps reduce manual work and extraneous intervention by IT personnel. In addition, the system aligns audit requirements with system repair. When using a downloadable agent, the system provides scalability, improved performance, and directed remediation.

Figure 1:
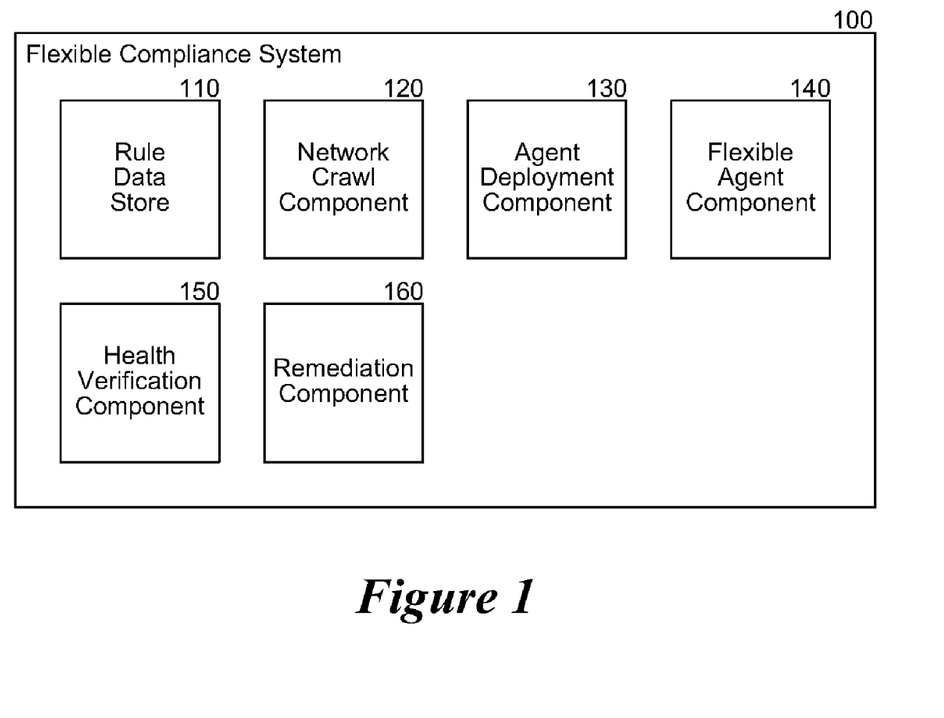
FIG. 1 is a block diagram that illustrates components of the flexible compliance system, in one embodiment.

FIG. 1 is a block diagram that illustrates components of the flexible compliance system, in one embodiment. The flexible compliance system 100 includes a rule data store 110, a network crawl component 120, an agent deployment component 130, a flexible agent component 140, a health verification component 150, and a remediation component 160. Each of these components is described in further detail herein.

The rule data store 110 contains a set of compliance rules and enforcement actions (collectively "rules" herein) that the flexible compliance system 100 is assigned to carry out for the organization. For example, compliance rules may include particular operating system or application patches that an administrator expects to be installed on each computer system in the organization. Enforcement actions specify the action the system will take if a computer system is out of compliance. For example, if certain patches are missing, an enforcement action may specify that the computer system not be allowed to access the network or another action may download and install the missing patch. The system 100 may provide an application, web page, or other interface for an administrator to define or import compliance rules and enforcement actions that the system 100 then stores in the rule data store 110.

The network crawl component 120 crawls the network (e.g., like a spider application) checking computer systems for compliance. The network crawl component 120 may receive notification of events, such as a computing system logging on to the network, that start a crawl. The network crawl component 120 may periodically re-crawl the network based on events that occur or a specified duration expiring.

The flexible compliance system 100 can operate in two different scanning modes: remote remediation (act from central server without installing an agent) or hybrid remediation mode (scans are done from a deployable agent that interacts with the central server for instructions and to provide results).

The agent deployment component 130 deploys the agent component 140 to applicable computer systems discovered by the network crawl component 120. For example, if a new machine logs onto the network, the agent deployment component 130 may send the agent component 140 to the computing system and request that the computing system execute the agent component 140 and validate the computer system's current level of compliance (i.e., health).

The flexible agent component 140 is an executable module or script that is deployable to various computer systems within an organization or network. The agent component 140 may be lightweight such that the system 100 can deploy it quickly to a computer system, request that the agent component 140 validate the health of the system, and then request that the agent component 140 remove itself from the computer system. One common request of compliance applications is that they produce as little impact or footprint on the systems that they monitor as possible. The agent component 140 allows the system 100 to deploy a small piece of code for a limited purpose that does not stay on the system when the purpose is fulfilled. In addition, because the agent component 140 has a short lifetime on the system relative to other installed programs, the agent is less likely to be compromised by malicious programs or undesirable user intervention.

In some embodiments, the meta-agent is installed into volatile memory of the target machine or short-term nonvolatile memory. For example, the system may install the meta-agent to a hidden temporary folder of the target computer system provided by the operating system. Thus, the agent may only be available for scanning and remediation as long as the target computer system is not rebooted or shutdown.

The health verification component 150 can be part of the agent component 140 or a separate component. The agent deployment component 130 may provide the health verification component 150 with rules from the rule data store 110 that the health verification component 150 is expected to validate against a computer system. The health verification component 150 compares the computer system to each compliance rule to determine whether the computer system satisfies the compliance rule. The compliance rule may specify particular conditions to check. For example, the compliance rule may specify a registry key value, file version, or other computer system attribute that the health verification component 150 detects to determine if the rule is satisfied. The health verification component may provide a report or statement of health to an administrator that indicates the compliance of the computer system.

The remediation component 160 can also be part of the agent component 140 or a separate component. The remediation component 140 applies enforcement actions from the rule data store 110 to remediate any violated compliance rules. For example, an enforcement action may specify a set of conditions that are to be met before the system 100 allows a computer system to access the network. If a computer system is non-compliant, then the remediation component 160 may, for example, instruct a DHCP client of the computer system not to obtain an IP address for network access or may instruct IPSEC components not to validate the computer system for access to sensitive data on the network. The remediation component 160 may act remotely or through the deployable agent described herein upon a non-compliant computer system to change registry, file, or security settings. The remediation component 160 can also remotely deliver and install patches and security updates.

There are many types of remediation that the flexible compliance system can perform, just a few of which are provided here as examples. For example, the flexible compliance system may modify security settings (e.g., set firewall settings, password strength, logon success/failure logging status, enable antivirus service status, disable last name display at logon), application settings (e.g., set web browser pop-up blocker settings, set remote or desktop assistance capabilities), operating system settings (version, automatic update settings, DNS client status), patch levels (e.g., install critical vendor patches), software inventory (e.g., removal of banned applications), and file settings (e.g., set file ACE, ACL, or attributes). Those of ordinary skill in the art will recognize that other types of remediation can easily be plugged into the system described.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

In some embodiments, the system signs the statement of health using a cryptographic key. The signature uses a key from the agent deployment component that is deployed with the agent and verifies the authenticity of the statement of health. This allows, for example, the administrator or system to automatically detect when a statement of health has been tampered with and prevents software code already located on the computer system from falsifying a statement of health.

In some embodiments, the network crawl component performs health verification and stores the output. For example, the network crawl component may produce an extensible markup language (XML) file or other report that specifies the compliance rules that a computer system satisfied and/or violated. The agent component consumes the output and performs remediation based on the details of the report.

In some embodiments, the flexible compliance system determines a score for the compliance of a computer system based on the health verification results. For example, some compliance rules may lead to a large score if satisfied (or a large negative score if violated), whereas other rules may have smaller scores. The system uses the score to make a binary system as to whether or not the computer system will be prevented (e.g., quarantined) from accessing the network. A sufficient score indicates that the computer system is far enough out of compliance to pose a risk to the security and health of the network, and thus the system prevents the computer system from accessing the network.

In some embodiments, the agent persists on the computing system after completing an initial verification of the computing system to monitor the compliance of the computer system over time and quarantine the system or provide other remediation as necessary. For example, after logging onto the network a user of the computer system may install a malicious or otherwise non-compliant application or may download a virus that causes the computer system to fall out of compliance. In such cases, the agent may detect the non-compliance condition and remove the computer system from the network. For example, the agent may instruct a TCP/IP stack of the computer system to stop transmitting and receiving packets.

In some embodiments, the flexible compliance system provides provisional access to the network to a computer system that has not yet been verified for compliance. For example, the flexible compliance system may allow the computer system to connect to the network to download the agent, patches, or access other resources. However, if the flexible compliance system determines that the computer system is non-compliant, then the flexible compliance system may limit or remove access to the network from the computer system.

Figure 2:
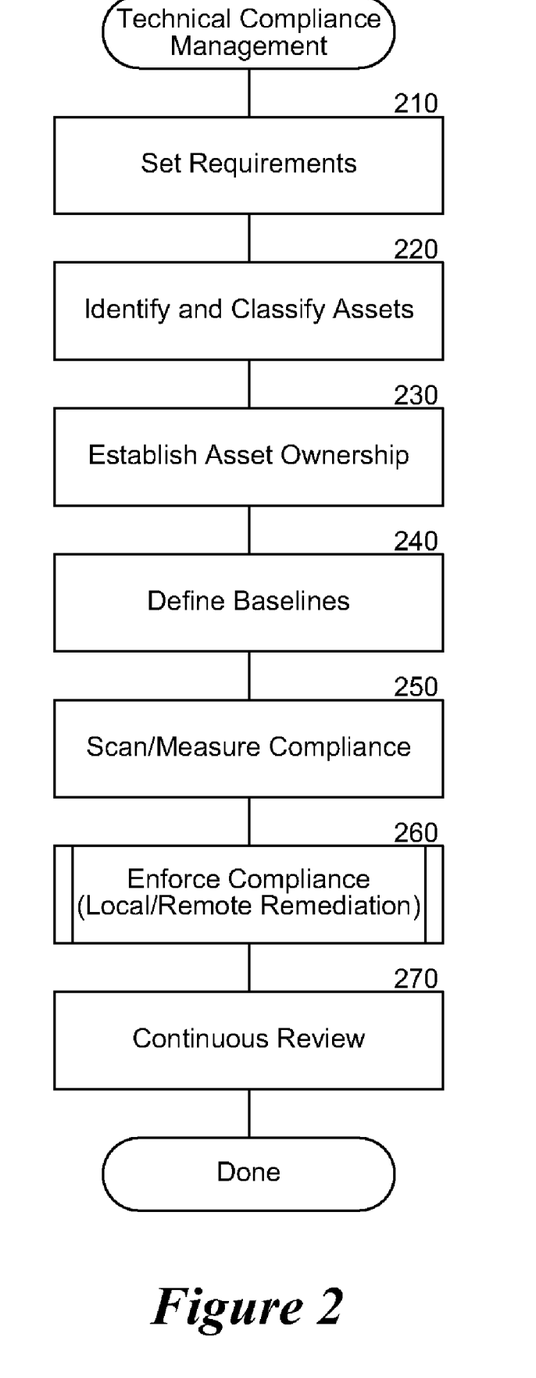
FIG. 2 is a flow diagram that illustrates the steps typically performed by IT personnel in a technical compliance management (TCM) lifecycle including the flexible compliance system, in one embodiment.

FIG. 2 is a flow diagram that illustrates the steps typically performed by IT personnel in a technical compliance management (TCM) lifecycle including the flexible compliance system, in one embodiment. In block 210, IT personnel set requirements. For example, IT personnel may review requirements and obtain executive sponsorship to improve compliance throughout the organization. IT personnel may review policies and standards, consult industry guidelines, begin an asset (e.g., computer systems, network resources, and so on) inventory, and create risk profiles. In block 220, IT personnel identify and classify assets. For example, they may identify systems and business components, determine compliance classifications and groups (e.g., patches, virus signatures, applications), determine compliance metrics, and populate databases related to the TCM lifecycle, such as the rule data store described herein. In block 230, IT personnel establish asset ownership. For example, they may identify stakeholders within the organization, line of business application owners, server and desktop support groups, unmanaged system (e.g., labs) owners, roles and responsibilities, and so forth.

In block 240, IT personnel establish baselines against which to measure compliance. For example, they may identify risk management requirements, security settings, application settings, operating system settings, patch levels, software inventory, and file settings that form the desired compliance level of the organization. In block 250, IT personnel scan and measure compliance, such as using network spider scanners that crawl one or more networks and collect information about various computer systems of the organization. IT personnel may invoke the flexible compliance system to perform this step. This step includes automating technical evaluation (e.g., by generating rules for the flexible compliance system), measuring the effectiveness of compliance controls, reporting compliance, and automating and providing technical triggers for remediation (e.g., by generating remediation steps for the flexible compliance system to perform).

In block 260, IT personnel enforce compliance. For example, they may invoke the flexible compliance system to quarantine computer systems or perform other remediation steps to correct identified compliance problems and restore the health of computer systems within the organization. The flexible compliance system may deploy the lightweight software agent described herein to execute on various computer systems within the organization. In addition, this step may include providing notifications to end users and enforcement systems, forced patching, isolating a system from the network, handling exceptions (e.g., systems that have a legitimate reason for non-compliance), and taking measures to prevent reoccurrences. In block 270, the process repeats in a continues series of reviewing policies and standards, reviewing industry guidelines, updating baseline requirements, re-evaluating the organization's environment, and ensure compliance of computer systems and other resources within the organization.

Figure 3:
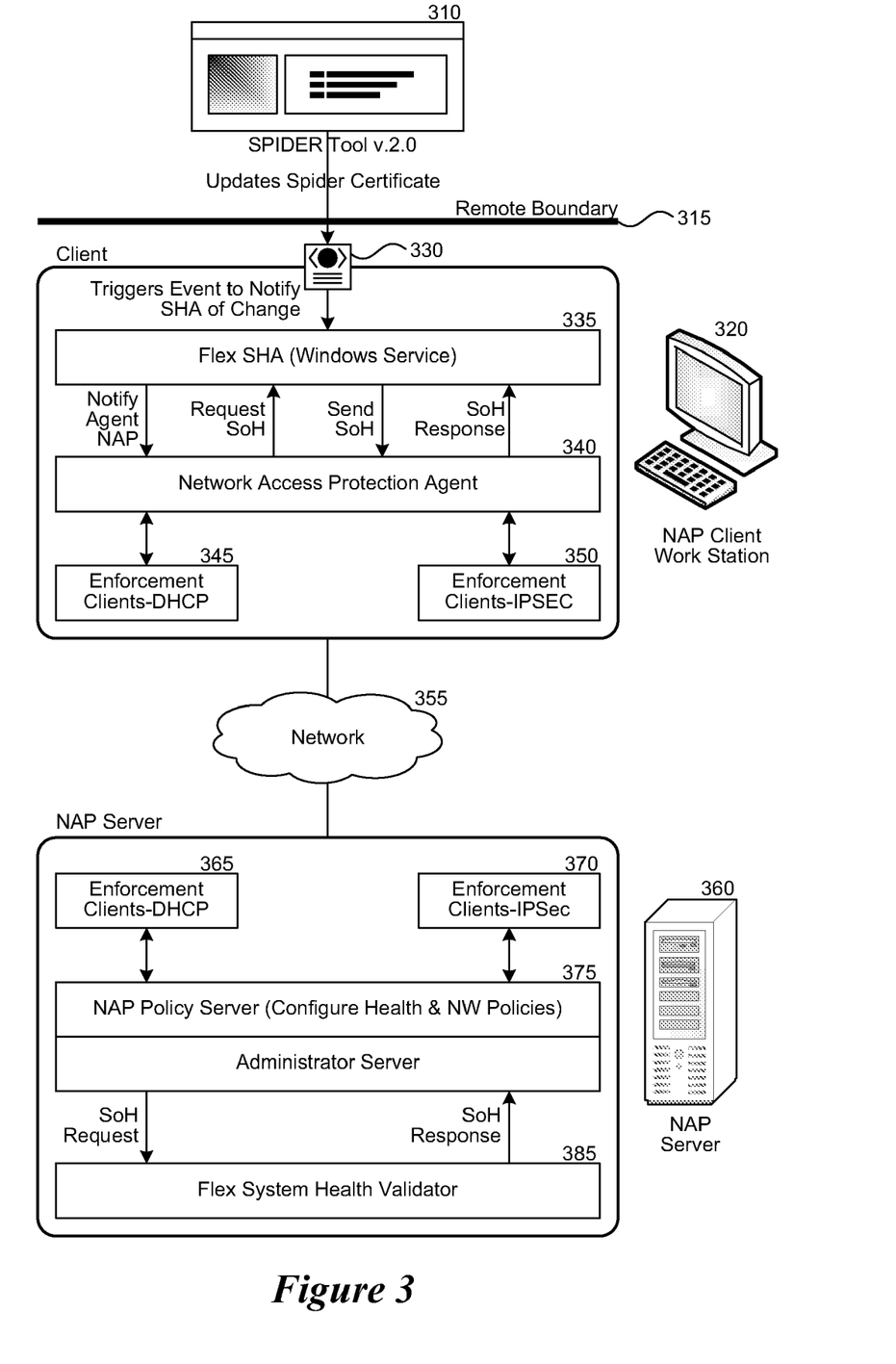
FIG. 3 is a block diagram that illustrates a typical operating environment of the flexible compliance system, in one embodiment.

FIG. 3 is a block diagram that illustrates a typical operating environment of the flexible compliance system, in one embodiment. A spider application 310 assesses the health of various client systems and produces an XML or other document 330 that defines health baselines for a computer system. A client computer system 320 receives the XML document 330. The client computer system 320 contains a flexible meta-agent 335, a network access protection agent 340, and one or more enforcement clients, such as a DHCP enforcement client 345 and an IPSEC enforcement client 350. The flexible meta-agent 335 notifies the network access protection agent 340 when an event occurs that potentially alters the compliance of the system (e.g., installation of an application) or signals a relevant time to check for compliance (e.g., during logon). The network access protection agent 340 requests a statement of health from the flexible meta-agent 335 that indicates the compliance of the client computer system 320 with the policies in the XML document 330. The flexible meta-agent 335 assesses the system health, generates the statement of health, and provides it to the network access protection agent 340. If the statement of health is good, indicating that the client system 320 is healthy, then the enforcement clients 345 and 350 allow the client system 320 to connect to the network 355, else the enforcement clients block or restrict access to the network 355.

The operating environment also includes a network access protection server 360 that includes one or more enforcement servers, such as a DHCP enforcement server 365 and an IPSEC enforcement server 370. The enforcement servers determine whether a client computer system 320 can connect to the network. For example, the DHCP enforcement server may not provide an IP address to a client computer system that has not provided a satisfactory statement of health. The enforcement servers interact with a network access protection policy server 375 that stores and enforces the organization's policies. The network access protection policy server 375 may also interact with a flexible system health validator 385 that determines the health of client systems, such as by deploying temporary copies of the flexible meta-agent 335 and instructing them to generate a statement of health for a client system.

Figure 4:
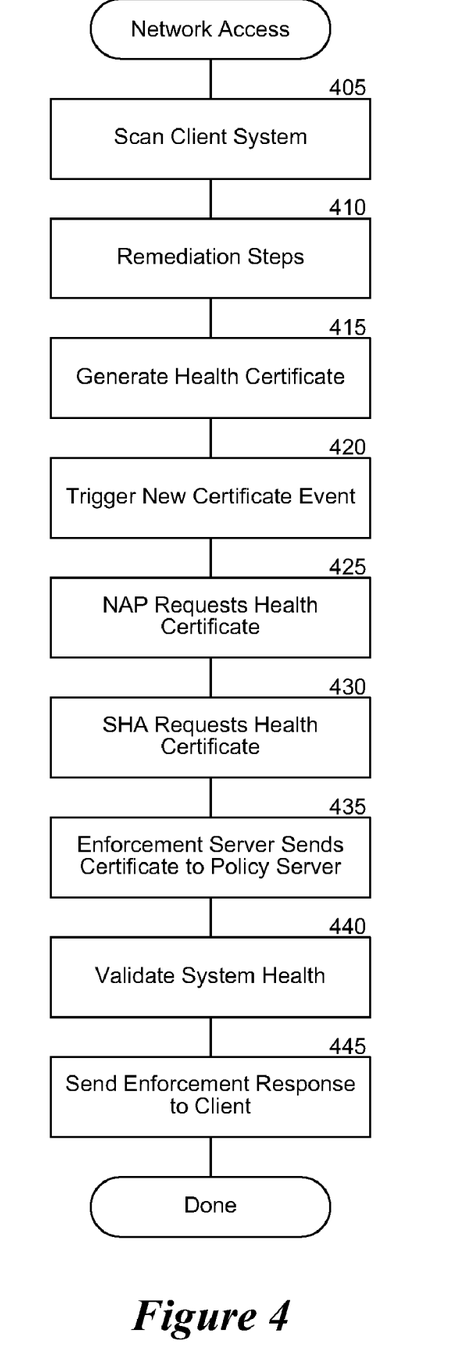
FIG. 4 is a flow diagram that illustrates the interaction between the components of the flexible compliance system to determine whether to grant a client system access to a network, in one embodiment.

FIG. 4 is a flow diagram that illustrates the interaction between the components of the flexible compliance system to determine whether to grant a client system access to a network, in one embodiment. In block 405, a spider engine runs to scan one or more client computer systems. The spider engine may run remotely or locally on each client systems depending on goals of the organization. For example, local scanning can be faster and have less impact on organization resources, but remote scanning can be more secure and less vulnerable to hacking of the client systems. In block 410, the system performs remediation steps based on areas of non-compliance determined by the scan and configurable remediation steps stored in the rule data store. In block 415, the system generates a certificate (e.g., a statement of health) that indicates the health of the client system. The flexible compliance system may store the certificate to keep a historical log of compliance or for other purposes. The certificate may include attributes, such as a pass/fail value that indicates whether the flexible compliance system will allow the client system to access the network and an end time value that indicates the time the scan was completed (e.g., for distinguishing the current scan from subsequent scans).

In block 420, the system triggers a new certificate event and informs the flexible meta-agent that a new health certificate is available for the client system. The flexible meta-agent then informs the network access protection agent. In block 425, the network access protection agent requests a statement of health from the flexible meta-agent and facilitates communication between the flexible meta-agent and enforcement client layers. In block 430, the flexible meta-agent forwards the request for the statement of health to the network access protection server. The network access protection server has a layer of enforcement server components. Each component is defined for a different type of network access, such as VPN, DHCP, and IPSec. In block 435, an enforcement server component obtains the list of statements of health from the corresponding enforcement client on the client computer system and sends them to a policy server (e.g., using Remote Authentication Dial-In User Service (RADIUS)). In block 440, the policy server communicates with one or more system health validators to validate the client system health based on a configured set of system health policies.

In block 445, the policy server sends an enforcement decision back to the client. For example, if the health of the client is satisfactory, then the policy server sends a response that indicates that the client can access the network. In that case, the enforcement clients permit the client system to access the network. If, on the other hand, the health of the client is not satisfactory, then the response may indicate that the enforcement clients should block the client system from accessing the network. After block 445, these steps conclude.

In some embodiments, the statement of health adheres to a common format with a limited size (e.g., 4,000 bytes) and the flexible compliance system consolidates information to reduce the number of bytes used. For example, whereas previous solutions consume a bit in the statement of health for each compliance test (e.g., antivirus software installed), the flexible compliance system may consume a single bit that provides a pass/fail indication as to whether multiple compliance tests succeeded or failed. The network access protection server does not necessarily know which tests failed or passed, but does know whether the assessment of the client system indicates that the client system should or should not be permitted to connect to the network or other organization resources.

Figure 5:
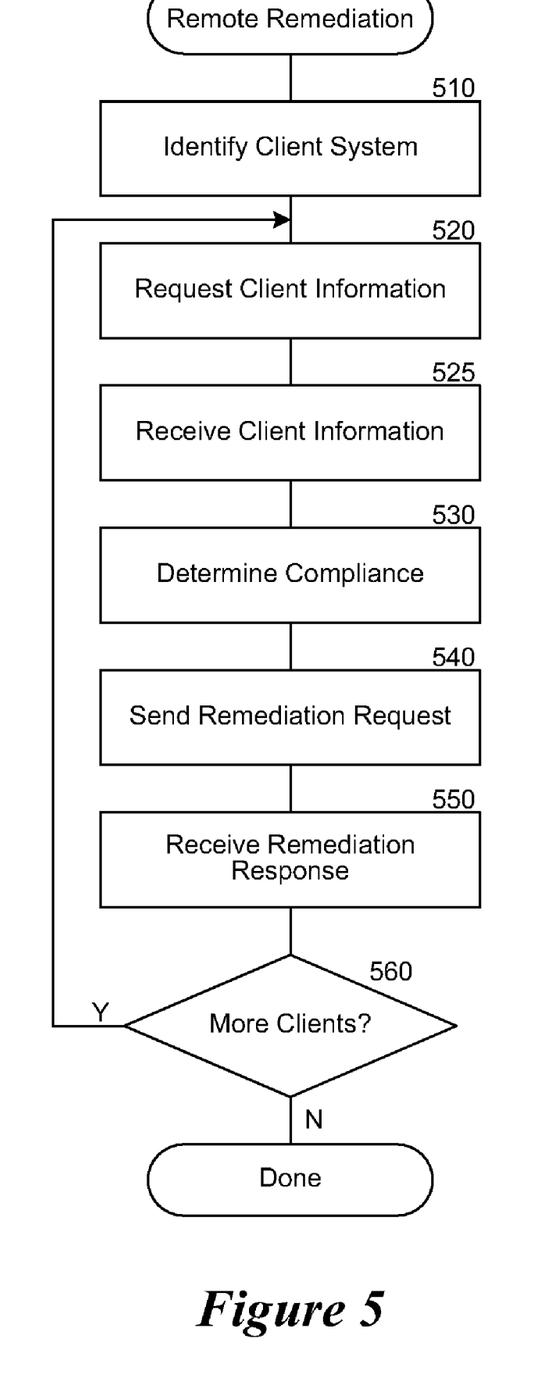
FIG. 5 is a flow diagram that illustrates the processing of the remediation component to remotely remedy compliance violations, in one embodiment.

FIG. 5 is a flow diagram that illustrates the processing of the remediation component to remotely remedy compliance violations, in one embodiment. These steps are invoked when compliance is requested for one or more compliance systems and the system is in the remote remediation mode. In block 510, the component identifies a client system. For example, the component may receive information about a client system from the network crawl component based on a network crawl. In block 520, the component remotely requests from a central server various information from the client based on the compliance rules. For example, the component may request registry information, file information, and so forth. In block 525, the component receives the requested information from the client. For example, the component may receive the values stored in one or more registry keys. In block 530, the component determines the compliance of the system based on the received information. For example, the system may compare received file versions with those specified by one or more compliance rules. In block 540, the component sends a remediation request to the client to remedy any determined violations. For example, the component may instruct the client to delete files, uninstall applications, install patches, and so forth. In block 550, the component receives a remediation response from the client. For example, the client may indicate whether each remediation step in the remediation request succeeded or failed. In decision block 560, if there are more clients then the component loops to block 520 to process the next client, else the component completes. After block 560, these steps conclude.

Figure 6:
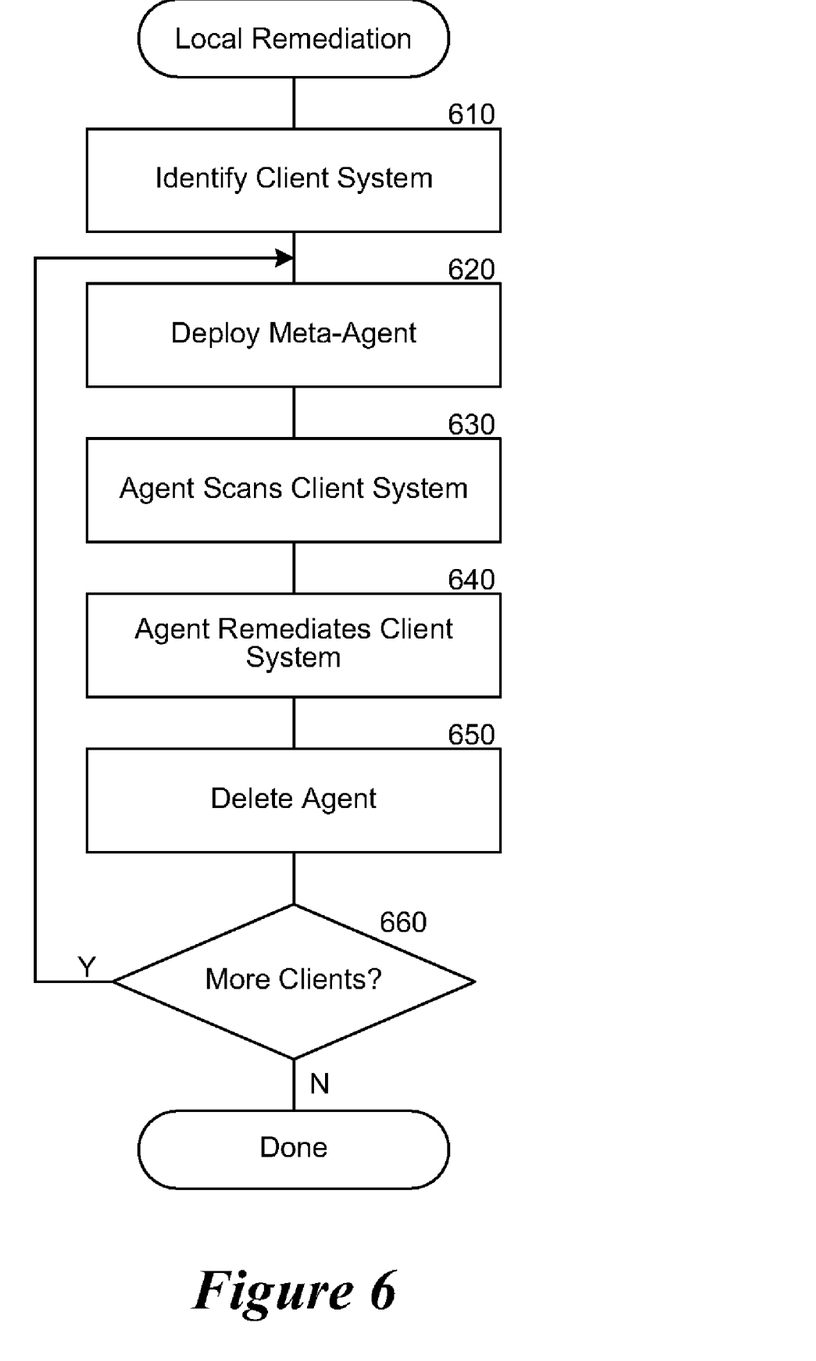
FIG. 6 is a flow diagram that illustrates the processing of the remediation component to locally remedy compliance violations, in one embodiment.

FIG. 6 is a flow diagram that illustrates the processing of the remediation component to locally remedy compliance violations, in one embodiment. These steps are invoked when compliance is requested for one or more compliance systems and the system is in the hybrid remediation mode. In block 610, the component identifies a client system. For example, the component may receive information about a client system from the network crawl component based on a network crawl. In block 620, the component deploys a flexible system agent to the client system that will execute locally on the client system. For example, a central server may instruct the client to download and execute a module containing the agent component. In block 630, the agent scans the client system to determine the compliance of the client system with rules accessed from the central server. For example, the agent may access local registry information, file information, and so forth on the client system. In block 640, the agent performs remediation request locally at the client to remedy any determined violations. For example, the agent may delete files, uninstall applications, install patches, and so forth. In block 650, the agent removes itself from the client system. For example, the agent may delete a module in which it was delivered and terminate or simply terminate if the agent resides only in memory on the client system. In decision block 660, if there are more clients then the component loops to block 620 to process the next client, else the component completes. After block 660, these steps conclude.

Those of ordinary skill in the art will recognize that although illustrated serially, the steps described herein may be performed in parallel. For example, the system may determine the compliance of many clients at the same time and/or apply automated remediation to many clients at the same time.

From the foregoing, it will be appreciated that specific embodiments of the flexible compliance system have been described herein for purposes of illustration, but that various modifications may be made without deviating from the spirit and scope of the invention. For example, the system could be used in areas outside of compliance detection and remediation, such as any situation where it is desirable to ensure the state of multiple computer systems. Accordingly, the invention is not limited except as by the appended claims.

I claim:

1. A computer-implemented method for remediating one or more non-compliant computer systems in a network, the method comprising:
   receiving one or more compliance rules, wherein the rules include conditions for detecting whether a computer system violates the rule and remediation steps associated with each rule for restoring compliance of the computer system when it violates the rule;
   identifying the computer system;
   remotely deploying a meta-agent to the computer system;
   through the remotely deployed meta-agent,
      determining the compliance of the computer system with the compliance rules by checking the included conditions; and
      when the computer system is determined to violate a compliance rule, performing the remediation steps associated with the violated compliance rule on the computer system; and
   after performing any remediation steps on the computer system, removing the meta-agent from the computer system.

2. The method of claim 1 wherein the remediation steps include quarantining the computer system from the network.

3. The method of claim 1 wherein the remediation steps include installing an application patch on the computer system.

4. The method of claim 1 wherein identifying the computer system comprises crawling the network with a spider application.

5. The method of claim 1 wherein identifying the computer system comprises receiving a logon notification related to the computer system.

6. The method of claim 1 wherein the received compliance rule conditions identify one or more registry values that indicate compliance of the computer system with the rule.

7. The method of claim 1 wherein the received compliance rule conditions identify one or more file versions that indicate compliance of the computer system with the rule.

8. The method of claim 1 wherein determining the compliance of the computer system comprises iterating through each compliance rule and checking the included conditions for each rule.

9. The method of claim 1 further comprising, when the computer system is determined to violate a compliance rule, determining a severity of the violated compliance rule and performing remediation steps that vary based on the severity.

10. The method of claim 1 wherein the remotely deployed meta-agent receives the compliance rules as an XML file that specifies one or more rule conditions for detecting compliance with the compliance rule and remediation instructions associated with the compliance rule.

11. The method of claim 1 wherein remotely deploying the meta-agent comprises installing the meta-agent as a temporary service on the computer system.

12. A computer system for maintaining the health of computer systems within an organization through automated remediation of compliance violations, the system comprising:
- a rule data store configured to store one or more rules for determining the health of computer systems in an organization;
- a network crawl component configured to crawl a network connecting at least some of the computer systems within the organization to identify computer systems the health of which the system maintains;
- an agent deployment component configured to deploy a software agent to identified computer systems to execute on the computer systems and to remove the agent from the identified computer systems after remediation is complete; and
- a flexible agent component configured to locally determine the compliance on the identified computer systems, wherein the flexible agent component includes a remediation component configured to perform automated remediation of detected compliance violations locally on the identified computer systems.

13. The system of claim 12 wherein the rule data store is further configured to store one or more remediation steps used by the remediation component to restore an unhealthy computer system to health.

14. The system of claim 12 wherein the flexible agent component resides temporarily in memory of the computer systems until remediation steps are complete.

15. The system of claim 12 wherein the agent deployment component copies the software agent to the identified computer systems and instructs the agent to execute.

16. The system of claim 12 wherein the flexible agent component accesses the rules stored in the rule data store on a central server.

17. A computer-readable non-transitory storage medium encoded with instructions for controlling a computer system to remotely provide automatic remediation of compliance problems of one or more client computer systems, by a method comprising:
- receiving at a remotely deployed meta-agent one or more compliance rules, wherein the rules include conditions for detecting whether a computer system violates the rule and remediation steps associated with each rule for restoring compliance of the computer system when it violates the rule;
- identifying a client computer system on which the remotely deployed meta-agent has been installed;
- requesting information related to compliance from the identified client computer system;
- receiving the requested compliance information;
- determining the compliance of the identified client computer system based on the received compliance information and the received compliance rules;
- performing one or more remediation steps on the identified client computer systems, wherein the remediation steps automatically resolve compliance violations based on the received remediation steps; and
- after performing the remediation steps, removing the meta-agent from the identified client computer system.

18. The computer-readable non-transitory medium of claim 17 wherein the remediation steps provide instructions for restoring compliance of the identified client computer system.

19. The computer-readable non-transitory medium of claim 17 wherein the remediation steps include at least one of modifying a registry key, deleting a file, installing a patch, and uninstalling an application.

* * * * *